United States Patent
Reddy et al.

(10) Patent No.: US 9,064,216 B2
(45) Date of Patent: Jun. 23, 2015

(54) IDENTIFYING LIKELY FAULTY COMPONENTS IN A DISTRIBUTED SYSTEM

(71) Applicant: Juniper Networks, Inc., Sunnyvale, CA (US)

(72) Inventors: Rajeshekar Reddy, San Jose, CA (US); Harshad Bhaskar Nakil, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 286 days.

(21) Appl. No.: 13/842,909

(22) Filed: Mar. 15, 2013

(65) Prior Publication Data

US 2013/0332399 A1 Dec. 12, 2013

Related U.S. Application Data

(60) Provisional application No. 61/729,474, filed on Nov. 23, 2012, provisional application No. 61/723,684, filed on Nov. 7, 2012, provisional application No. 61/723,685, filed on Nov. 7, 2012, provisional application No. 61/722,696, filed on Nov. 5, 2012, provisional application No. 61/721,979, filed on Nov. 2, 2012, provisional application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(51) Int. Cl.
| | | |
|---|---|---|
| G06F 17/00 | (2006.01) |
| G06N 5/02 | (2006.01) |
| G06N 99/00 | (2010.01) |
| H04L 12/26 | (2006.01) |
| H04L 12/24 | (2006.01) |

(52) U.S. Cl.
CPC .............. *G06N 99/005* (2013.01); *H04L 43/04* (2013.01); *H04L 41/147* (2013.01); *H04L 41/0631* (2013.01)

(58) Field of Classification Search
USPC .......................................................... 706/12
See application file for complete search history.

(56) References Cited

U.S. PATENT DOCUMENTS

| | | |
|---|---|---|
| 7,184,437 B1 | 2/2007 | Cole et al. |
| 8,018,891 B2 * | 9/2011 | Reddy et al. .................. 370/320 |

(Continued)

OTHER PUBLICATIONS

On converged multidomain management of connectivity in heterogeneous networks, Derakhshan, F. ; Grob-Lipski, H. ; Rossler, H. ; Schefczik, P. ; Soellner, M. Future Network & Mobile Summit (FutureNetw), 2012 Publication Year: 2012 , pp. 1-9.*

(Continued)

*Primary Examiner* — Michael B Holmes
(74) *Attorney, Agent, or Firm* — Shumaker & Sieffert, P.A.

(57) ABSTRACT

In general, techniques are described for automatically identifying likely faulty components in massively distributed complex systems. In some examples, snapshots of component parameters are automatically repeatedly fed to a pre-trained classifier and the classifier indicates whether each received snapshot is likely to belong to a fault and failure class or to a non-fault/failure class. Components whose snapshots indicate a high likelihood of fault or failure are investigated, restarted or taken off line as a pre-emptive measure. The techniques may be applied in a massively distributed complex system such as a data center.

20 Claims, 11 Drawing Sheets

(56) References Cited

U.S. PATENT DOCUMENTS

| | | | |
|---|---|---|---|
| 8,122,127 B2* | 2/2012 | Bhatt et al. | 709/224 |
| 8,295,172 B1* | 10/2012 | Singla et al. | 370/230.1 |
| 8,369,211 B2* | 2/2013 | Agarwal et al. | 370/221 |
| 8,442,064 B2* | 5/2013 | Singla et al. | 370/422 |
| 8,705,353 B1* | 4/2014 | Reddy et al. | 370/230 |
| 8,750,288 B2* | 6/2014 | Nakil et al. | 370/351 |
| 8,755,377 B2* | 6/2014 | Nakil et al. | 370/360 |
| 8,797,897 B1* | 8/2014 | Bhatt et al. | 370/252 |
| 8,953,441 B2* | 2/2015 | Nakil et al. | 370/228 |
| 8,958,285 B2* | 2/2015 | Agarwal et al. | 370/221 |
| 8,959,185 B2* | 2/2015 | Nakil et al. | 709/219 |
| 2010/0057649 A1 | 3/2010 | Lee et al. | |

OTHER PUBLICATIONS

Predictive analytics: Assessing failure rate accuracy & failure mode completeness, Bukowski, J.V. ; Goble, W.M. Reliability and Maintainability Symposium (RAMS), 2013 Proceedings—Annual DOI: 10.1109/RAMS.2013.6517619 Publication Year: 2013 , pp. 1-7.*

A pragmatic approach to predict hardware failures in storage systems using MPP database and big data technologies, Kumar, R. ; Vijayakumar, S. ; Ahamed, S.A. Advance Computing Conference (IACC), 2014 IEEE International DOI: 10.1109/IAdCC.2014.6779422 Publication Year: 2014 , pp. 779-788.*

Soldered joints on leaded components: development of a design tool to predict failure during temperature cycle tests, Wolbert, P.M.M. ; Brombacher, A.C. Reliability of Electron Devices, Failure Physics and Analysis, 1996. Proceedings of the 7th European Symposium on DOI: 10.1109/ESREF.1996.888217 Publication Year: 1996 , pp. 1791-1797.*

Extended European Search Report from corresponding European Application No. 13170817.4, dated Oct. 8, 2013, 9 pp.

"Amazon CloudWatch Developer Guide API Version Aug. 1, 2010," Amazon Web Services LLC, 2011, 106 pp.

Handigol et al., "Aster*x: Load-Balancing Web Traffic over Wide-Area Networks," 9th GENI Engineering Conference (GEC9), Nov. 2, 2010, 3 pp.

U.S. Appl. No. 13/724,975 by Santosh Kumar Dornal, filed Dec. 21, 2012.

* cited by examiner

IDENTIFYING LIKELY FAULTY COMPONENTS IN A DISTRIBUTED SYSTEM

PRIORITY CLAIM

This application claims the benefit of U.S. Provisional Application No. 61/729,474, filed Nov. 23, 2012, U.S. Provisional Application No. 61/723,684, filed Nov. 7, 2012; U.S. Provisional Application No. 61/723,685, filed Nov. 7, 2012; U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012, the entire content of each of which being incorporated herein by reference.

TECHNICAL FIELD

Techniques of this disclosure relate generally to computer networks, and more particularly to fault detection in computer networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Within a data center or other massively distributed complex system, faults and failures are not equivalent. Faults may allow for the continued operation of components of the system that rely on the faulted component. However, faults may develop into and tend to indicate pending failure of one or more components of the system, which deleteriously affects the operation of the system.

SUMMARY

In general, techniques are described for automatically identifying likely faulty components in massively distributed complex systems. In some examples, snapshots of component parameters are automatically repeatedly fed to a pre-trained classifier and the classifier indicates whether each received snapshot is likely to belong to a fault and failure class or to a non-fault/failure class. Components whose snapshots indicate a high likelihood of fault or failure are investigated, restarted or taken off line as a pre-emptive measure. The techniques may be applied in a massively distributed complex system such as a data center.

In some examples, a method of predicting component failure comprises receiving, by a communication protocol and with a virtual network controller that includes an analytics plane to analyze operations of a plurality of components in one or more virtual networks, a first parameter set from each of the components, wherein a parameter set from a component includes one or more quantitative parameters that each describes a state of the component. The method also comprises receiving, by the communication protocol and with the virtual network controller, an indication of detected component failure for one or more of the components. The method also comprises training, with the virtual network controller and using the first parameter sets and the indication of detected component failure, a trainable automated classifier to develop a classifying structure that distinguishes between component parameter sets that logically associate with a detected component failure and component parameter sets that do not logically associate with a detected component failure. The method also comprises receiving, by the communication protocol and with the virtual network controller, a second parameter set from each of the components. The method further comprises predicting, with the virtual network controller using the trainable automated classifier and the classifying structure, a failure of a first one of the components.

In some examples, a method for identifying likely faulty components in a massively distributed system comprises:
 (a) subdividing the system into a plurality of tiers;
 (b) for each respective tier, identifying respective quantitative parameters of respective components of the respective tier whose quantitative values are likely to act as indicators of component failure;
 (c) for each respective tier, automatically repeatedly capturing sample snapshots of the identified respective quantitative parameters of the tier components;
 (d) for each respective tier, automatically repeatedly detecting component failures;
 (e) for each respective detected component failure, logically associating the detected component failure with one or more of the respective captured parameter snapshots that immediately preceded the respective component failure;
 (f) automatically repeatedly training a trainable automated classifier to develop a classifying structure that distinguishes between first component parameter sets that logically associate with a detected failure and second component parameter sets that do not logically associate with a detected failure;
 (g) after said training, placing the trained classifier in a prediction mode wherein the trained classifier is automatically repeatedly fed with the automatically repeatedly captured sample snapshots and wherein the trained classifier uses its developed classifying structure to classify the in-prediction-mode sample snapshots as correlating to likely failure or as correlating to likely non-failure;
 (h) investigating those of the in-prediction-mode sample snapshots that were correlated to failure as being likely to be fault-indicating parameter sets; and
 (i) taking preemptive measures for those of the respective tier components that were determined to be more highly likely to enter a failure mode based on the in-prediction-mode indication that the corresponding sample snapshots correlate to failure.

In some examples, a virtual network controller comprises an analytics plane, a control plane, and one or more processors configured to execute the analytics plane to analyze operations of a plurality of components in one or more virtual networks, wherein the control plane receives, by a communication protocol, a first parameter set from each of the components, wherein a parameter set from a component includes one or more quantitative parameters that each describe a state of the component, wherein the control plane receives, by the communication protocol, an indication of detected component failure for one or more of the components, and wherein the control plane provides the first parameter sets and the indication of detected component failure to the analytics plane. The virtual network controller also comprises a trainable automated classifier, wherein the analytics plane trains, using the first parameter sets and the indication of detected component failure, the trainable automated classifier to develop a classifying structure that distinguishes between first component parameter sets that logically associate with a detected component failure and second component parameter sets that do not logically associate with a detected component failure, wherein the control plane receives, by the communication protocol, a second parameter set from each of the components and provides the second parameter sets to the analytics plane, and wherein the analytics plane predicts, using the trainable automated classifier and the classifying structure, a failure of a first one of the components.

In some examples, a non-transitory computer-readable medium comprises instructions that, when executed, cause one or more programmable processors to receive, by a communication protocol and with a virtual network controller that includes an analytics plane to analyze operations of a plurality of components in one or more virtual networks, a first parameter set from each of the components, wherein a parameter set from a component includes one or more quantitative parameters that each describes a state of the component. The instructions also cause the processor(s) to receive, by the communication protocol and with the virtual network controller, an indication of detected component failure for one or more of the components. The instructions also cause the processor(s) to train, with the virtual network controller and using the first parameter sets and the indication of detected component failure, a trainable automated classifier to develop a classifying structure that distinguishes between component parameter sets that logically associate with a detected component failure and component parameter sets that do not logically associate with a detected component failure. The instructions also cause the processor(s) to receive, by the communication protocol and with the virtual network controller, a second parameter set from each of the components. The instructions also cause the processor(s) to predict, with the virtual network controller using the trainable automated classifier and the classifying structure, a failure of a first one of the components.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
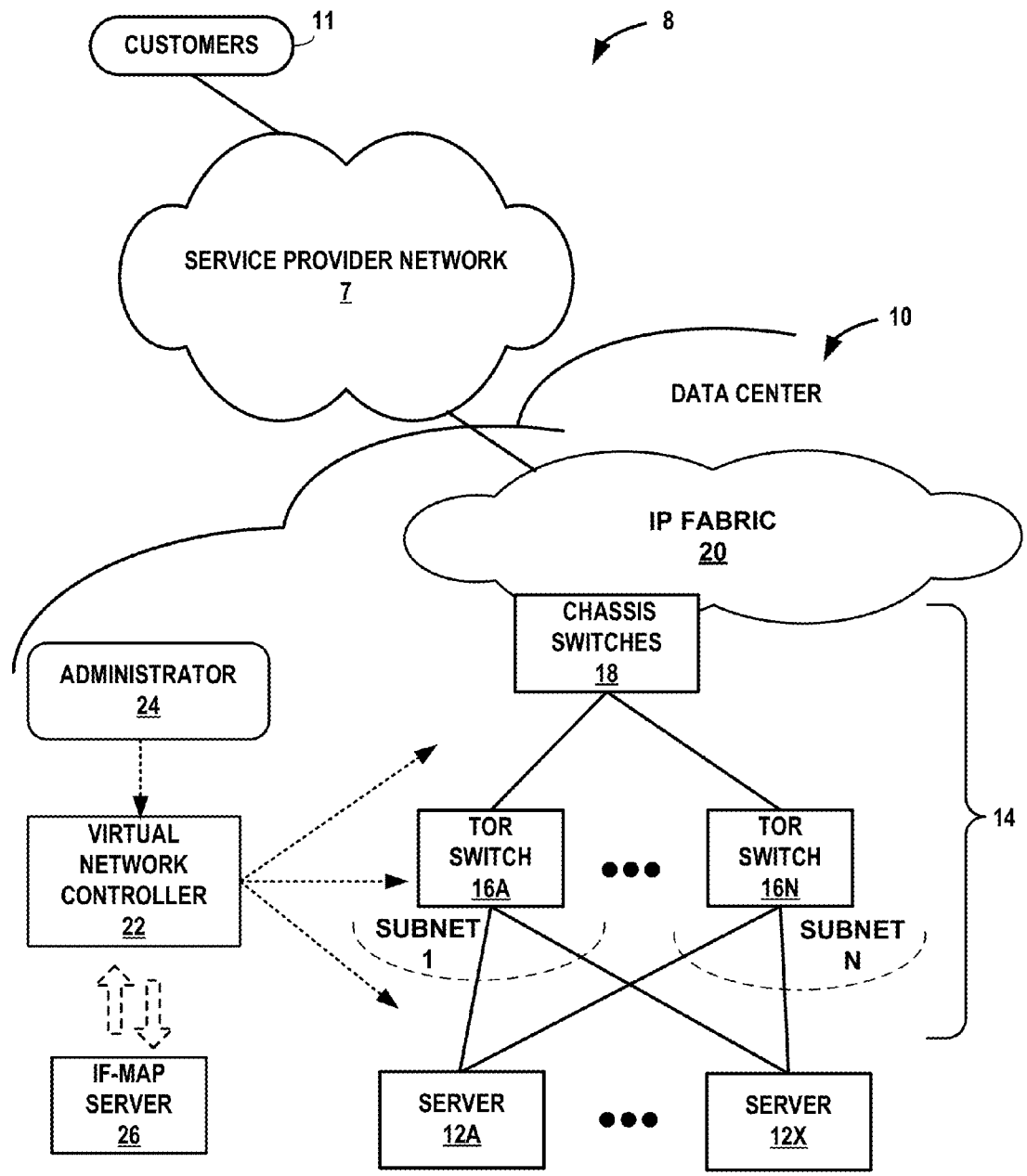
FIG. 1 is a block diagram illustrating an example data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 5 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 5 includes set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN ("TOR switches" 16) coupled to a distribution layer of chassis switches 18. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregates traffic flows and provides high-speed connectivity between TOR switches 16. TOR switches 16A and 16B may be network devices that provide layer 2 (MAC address) and/or layer 3 (IP address) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 using service provider network 7.

Virtual network controller 22 ("VNC") provides a logically centralized controller for facilitating operation of one or more virtual networks within data center 10 in accordance with one or more embodiments of this disclosure. In some examples, virtual network controller 22 may operate in response to configuration input received from network administrator 24.

Figure 2:
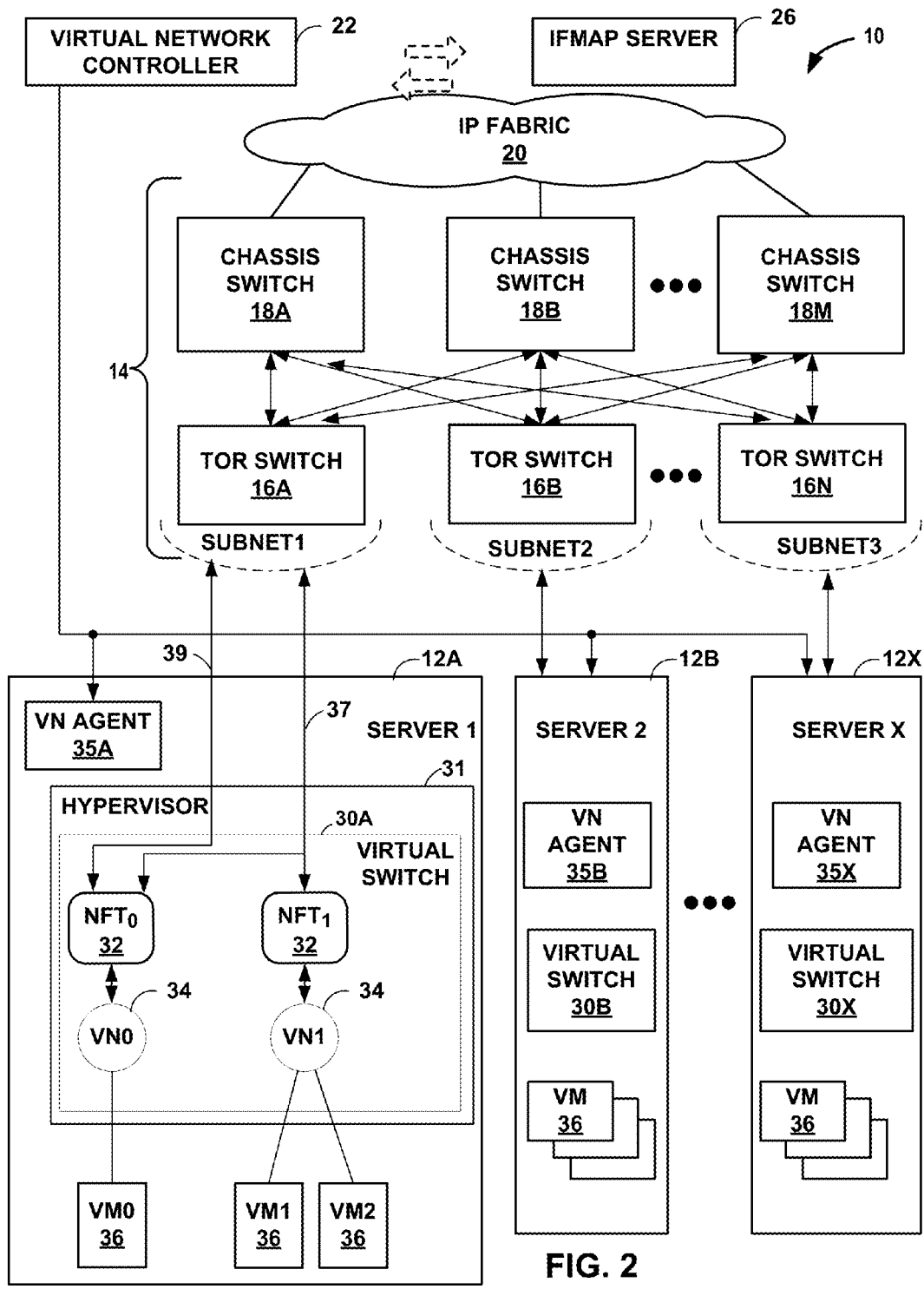
FIG. 2 is a block diagram illustrating in further detail an example system in which the techniques described herein may be implemented.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software switches 30A-30X (also referred to as a "virtual switches). Virtual switches 30 dynamically create and manage one or more virtual networks 34 to be used by applications communicating with application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network 34 may use its own addressing and security scheme and may be viewed as orthogonal from the physical network and its addressing scheme. For example, virtual switch 30A may represent a virtual network switch implemented server 12A (which may be an edge device positioned at an edge of the one or more virtual networks) and may be configured to facilitate overlay of a plurality of networks in the one or more virtual networks using a layer 3 protocol, which is a network layer protocol. Facilitating the network overlay using the layer 3 protocol may be substantially easier than using a layer 2 protocol. This may reduce an implementation cost of the one or more virtual networks. Various techniques may be used to transport packets within and across virtual network(s) 34 over the physical network.

Each virtual switch 30 may execute within a hypervisor, a host operating system or other component of each of servers 12. In some instances, any of virtual switches 30 may be present in a campus access switch or Wi-Fi access point (WAP). In the example of FIG. 2, virtual switch 30 executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, i.e., server 12A in the example of FIG. 2.

In one implementation, each of servers 12 includes a virtual network agent ("VN agent") 35A-35X ("VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center to create one or more overlay networks. Other example tunneling protocols may be used, including IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., on or more routing tables that store routing information for the physical network as well as the overlay network of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with one or more outer IP addresses.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicasting replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

Figure 3:
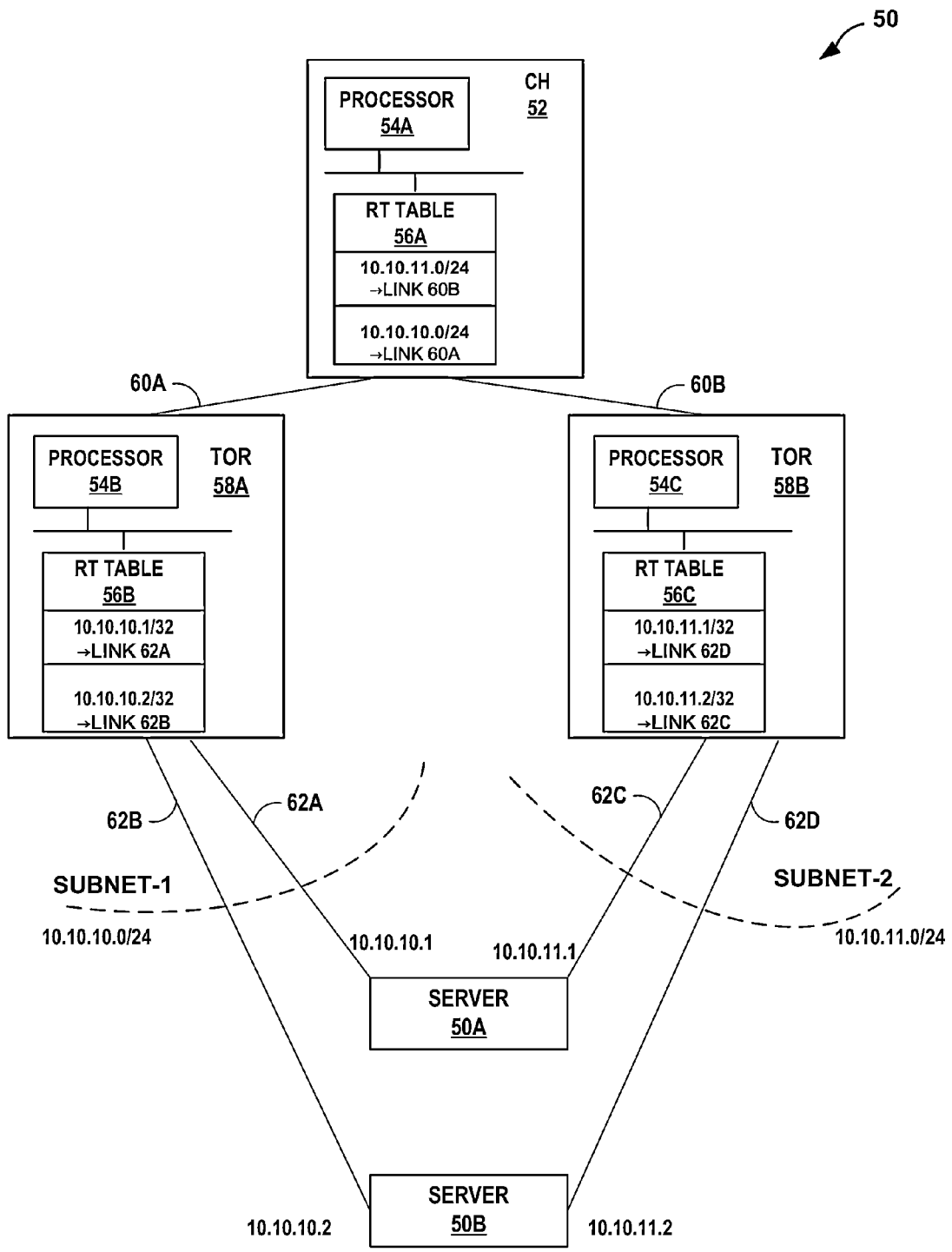
FIG. 3 is another block diagram illustrating an example system illustrating example configuration of chassis switch and top-of-rack (TOR) switches as described herein.

FIG. 3 is a block diagram illustrating an example system 50 illustrating example configuration of routing information within chassis switch and TOR switches as described herein. System 50 of FIG. 3 may, for example, correspond to portions of data center 10 illustrated in FIGS. 1 and 2.

In this example, chassis switch 52 ("CH 52"), which may be any of chassis switches 18 of FIG. 1, is coupled to Top of Rack (TOR) switches 58A-58B ("TORs 58") by chassis link 60A and chassis link 60B, respectively ("chassis links 60"). TORs 58 may, in some examples, be any of TORs 16 of FIG. 1. In the example of FIG. 3, TORs 58 are also coupled to servers 50A-50B ("servers 50") by TOR links 62A-62D ("TOR links 62"). Servers 50 may be any of servers 210 (FIG. 1). Here, servers 50 communicate with both TORs 58, and can physically reside in either associated rack. TORs 58 each communicate with a number of network switches, including chassis switch 18A.

Chassis switch 52 has a processor 54A in communication with an interface for communication with a network as shown, as well as a bus that connects a memory (not shown) to processor 54A. The memory may store a number of software modules. These modules include software that controls network routing, such as an Open Shortest Path First (OSPF) module (not shown) containing instructions for operating the chassis switch 18A in compliance with the OSPF protocol. Chassis switch 52 maintains routing table ("RT table") 56A containing routing information for packets, which describes a topology of a network. Routing table 56A may be, for example, a table of packet destination Internet protocol (IP) addresses and the corresponding next hop, e.g., expressed as a link to a network component.

TORs 58 each have a respective processor 54B, 54C, an interface in communication with chassis switch 18A, and a memory (not shown). Each memory contains software modules including an OSPF module and routing table 56B, 56C as described above.

TORs 58 and chassis switch 52 may exchange routing information specifying available routes, such as by using a link-state routing protocol such as OSPF or IS-IS. TORs 58 may be configured as owners of different routing subnets. For example, TOR 58A is configured as the owner of Subnet 1, which is the subnet 10.10.10.0/24 in the example of FIG. 2, and TOR 58B is configured as the owner of Subnet 2, which is the subnet 10.10.11.0/24 in the example of FIG. 2. As owners of their respective Subnets, TORs 58 locally store the individual routes for their subnets and need not broadcast all route advertisements up to chassis switch 52. Instead, in general TORs 58 will only advertise their subnet addresses to chassis switch 52.

Chassis switch 52 maintains a routing table ("RT table") 56A, which includes routes expressed as subnets reachable by TORs 58, based on route advertisements received from TORs 58. In the example of FIG. 2, RT table 56A stores routes indicating that traffic destined for addresses within the subnet 10.10.11.0/24 can be forwarded on link 60B to TOR 58B, and traffic destined for addresses within the subnet 10.10.10.0/24 can be forwarded on link 60A to TOR 58A.

In typical operation, chassis switch 52 receives Internet Protocol (IP) packets through its network interface, reads the packets' destination IP address, looks up these addresses on routing table 56A to determine the corresponding destination component, and forwards the packets accordingly. For example, if the destination IP address of a received packet is 10.10.10.0, i.e., the address of the subnet of TOR 58A, the routing table of chassis switch 52 indicates that the packet is to be sent to TOR 58A via link 60A, and chassis switch 52 transmits the packet accordingly, ultimately for forwarding to a specific one of the servers 50.

Similarly, each of TORs 58 receives Internet Protocol (IP) packets through its network interface, reads the packets' destination IP address, looks up these addresses on its routing table 56 to determine the corresponding destination component, and forwards the packets according to the result of the lookup.

Figure 4:
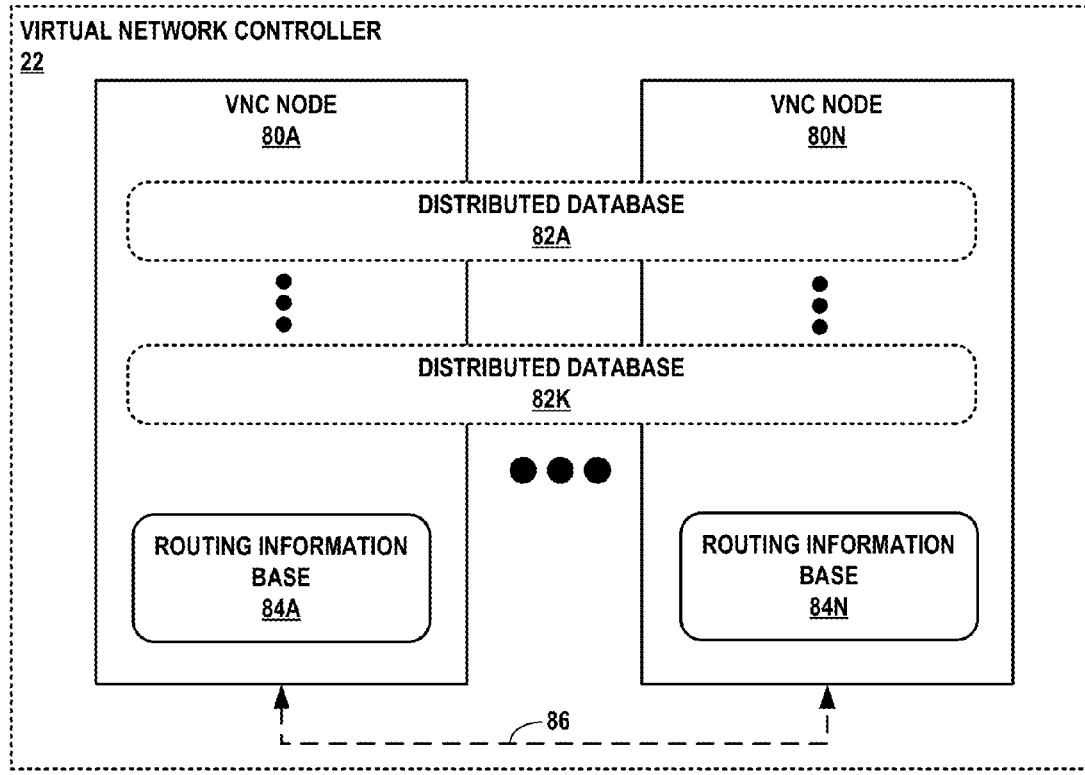
FIG. 4 is a block diagram illustrating an example implementation of a virtual network controller for facilitating operation of one or more virtual networks in accordance with one or more embodiments of this disclosure.

FIG. 4 is a block diagram illustrating an example implementation of a virtual network controller 22 for facilitating operation of one or more virtual networks in accordance with one or more embodiments of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 22. Distributed databases 82 may be implemented/stored using computer-readable media of or associated with VNC nodes 22.

Figure 5:
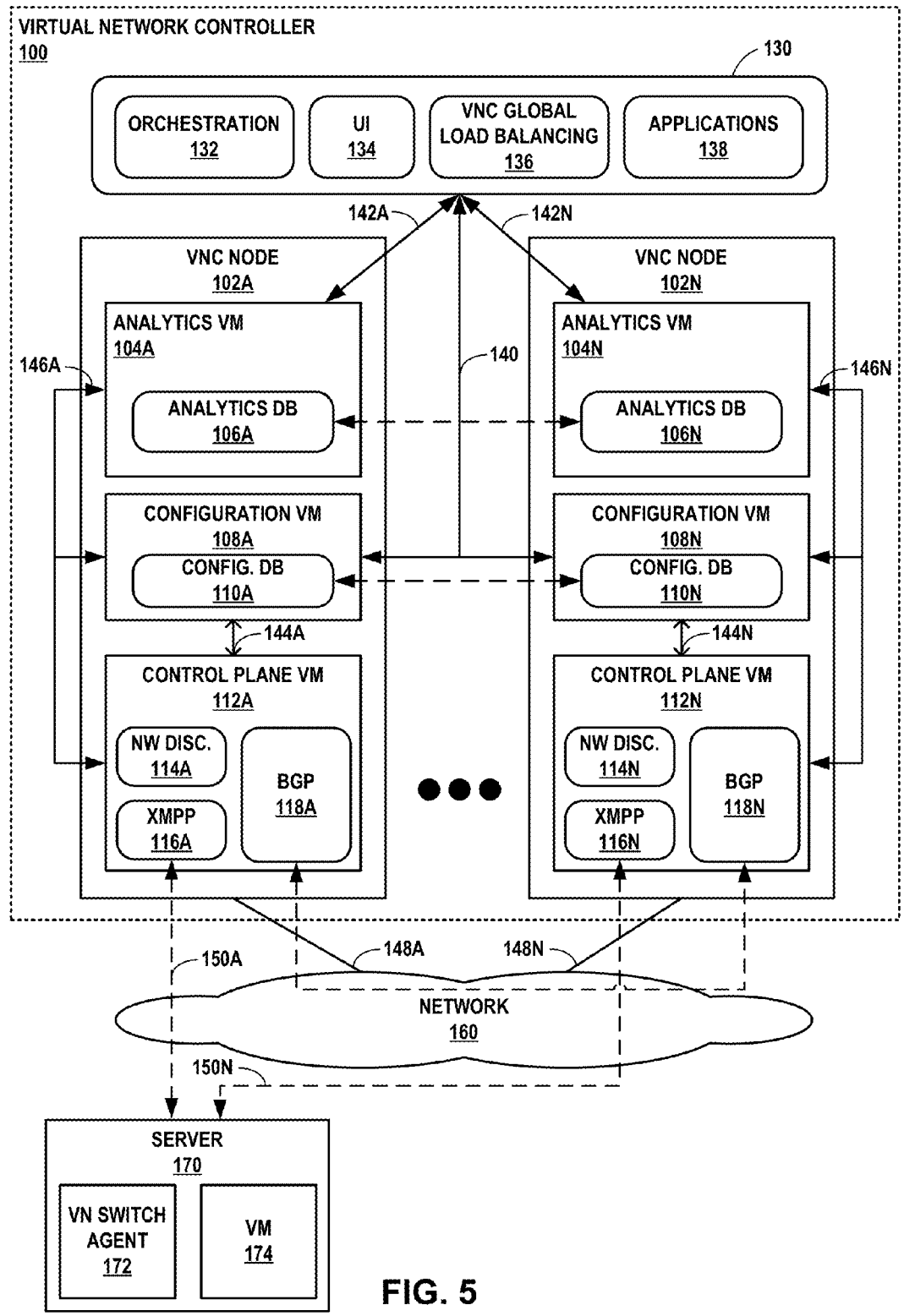
FIG. 5 is a block diagram illustrating an example implementation of a virtual network controller for facilitating operation of one or more virtual networks in accordance with one or more embodiments of this disclosure.

FIG. 5 is a block diagram illustrating an example implementation of a virtual network controller 100 for facilitating operation of one or more virtual networks in accordance with one or more embodiments of this disclosure. Virtual network controller 100 may, for example, correspond to virtual network controller 22 of data center 10 of FIGS. 1 and 2 or virtual network controller 22 of FIG. 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. In this sense, VNC nodes 102A and 102N may represent a first controller node device and a second controller node device peered using a peering protocol. VNC nodes 102 include respective network discovery modules 114A-114N to discover network elements of network 160.

VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility. Further, distributed VNC 100 may enable may enable horizontally scalable configuration and management, which may give a single system view of the one or more virtual networks.

Each of VNC nodes 102 may include substantially similar/analogous components for performing substantially similar/analogous functionality, said functionality being described hereinafter primarily with respect to VNC node 102A. VNC node 102A may include an analytics database 106A for storing diagnostic information related to a first set of elements managed by VNC node 102A. Analytics database 106A may include a horizontally scalable network analytics database, which may represent a fully integrated analytics collector configured to troubleshoot, visualize, and analyze distributed VNC 100 and the one or more virtual networks. VNC node 102A may share at least some diagnostic information related to VNC node 102A and/or one or more of the first set of elements managed by VNC node 102A and stored in analytics database 106, as well as receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A (including, e.g., VNC node 102A), as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4.

Configuration databases 110 may store respective RIBs 84 of FIG. 4. Portions of RIBs 84 may be stored by control plane VMs 112 to facilitate operation of network discovery modules 114 and BGPs 118.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding. In some instances, a centralized network management system or other controller executes modules 130 and communicates using a northbound interface of VNC nodes 102 to perform orchestration, configure VNC nodes 102, perform VNC global load balancing, and execute VNC nodes 102 with virtual network applications 138.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 170, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector, e.g., analytics VM 104A) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface. Server 170 may represent an example instance of any of servers 12 of FIGS. 1-2 or servers 50 of FIG. 3, with virtual network switch 174 representing any of virtual switches 30 and virtual network switch agent 172 representing any of virtual network agents 35 of FIG. 2, for example.

VNC node 102A may further include configuration VM 108A to store configuration information for the first set of element and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database represented by configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 and of customer networks. Analytics database 106A of analytics VM 104A may include an XMPP interface on a first (southbound) side and a REST/JASON/XMPP interface on a (northbound) second side by communication interface 142A.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), multicast DNS (mDNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-hosts irrespective of physical network topology, access type, and/or location. Distributed VNC 100 may provide programmatic ways for network operators and/or applications to change topology, to affect packet forwarding, and/or to add services, as well as horizontal scaling of network services, e.g. firewall, without changing the end-host view of the network.

Figure 6A:
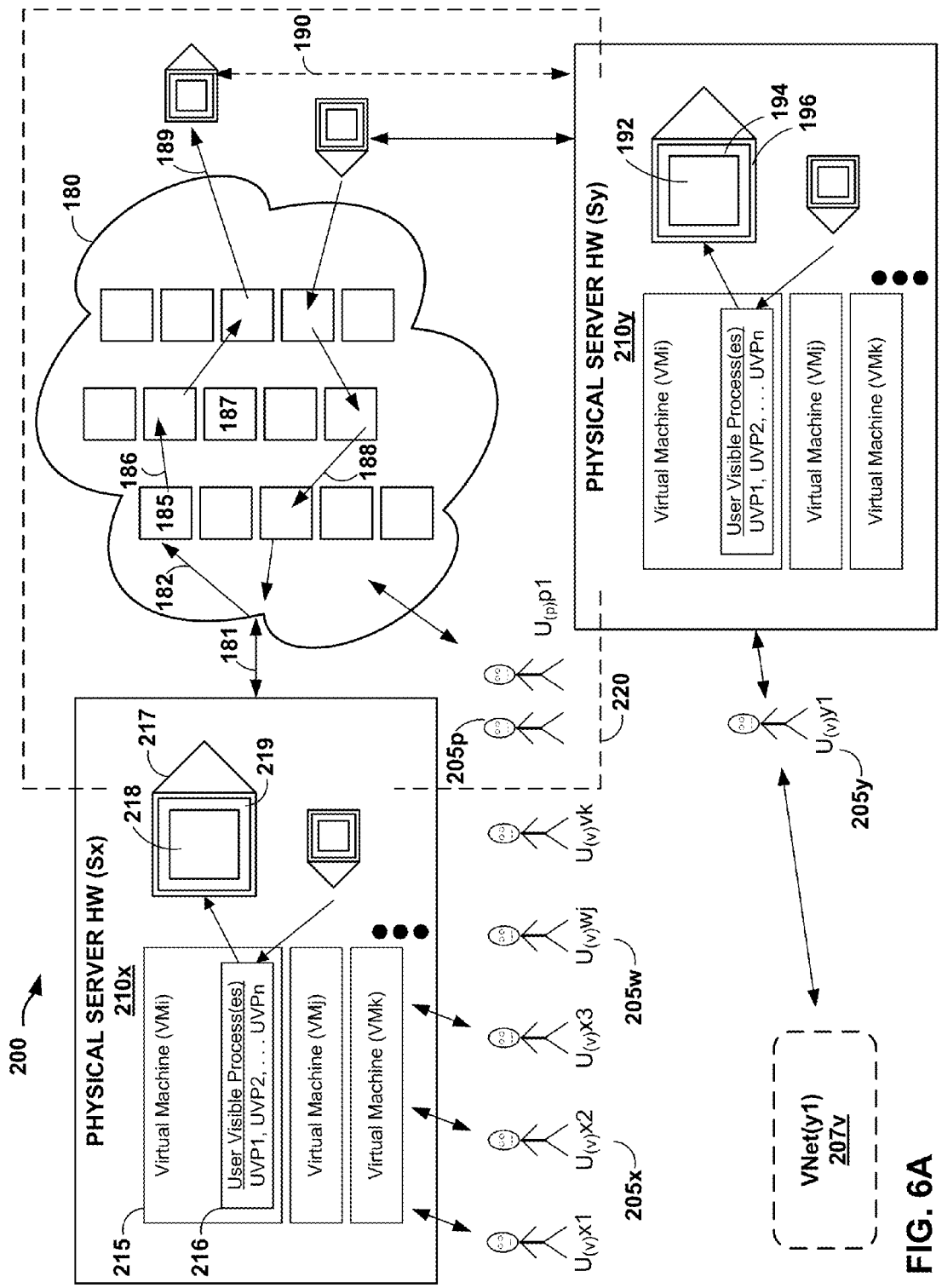
FIG. 6A is a block diagram of a massively distributed complex system in which identifying likely faulty components may be carried out according to techniques described in this disclosure.

FIG. 6A is a block diagram of a massively distributed complex system 200, and more specifically, of a software defined networking (SDN) system that operates according to techniques described in this disclosure. System 200 may represent an example instance of network 8 of FIG. 1. That is, system 200 may represent a cloud-implementing data center environment in which there is provided a large collection of network-interconnected servers (e.g., 210x, 210y) that provide compute and/or storage capacity to run many different user and/or other kinds of application programs (e.g., user visible process(es) 216). Such an environment tends to be very dynamic from an applications point of view. System 200 may include level of automation that, at least to some extent, insulates users from the infrastructure details and that avoids need for manual intervention to interconnect the physical servers to provide the compute or storage capacity required to enable the various applications to execute to one level of sufficiency or another.

In order to enable automation and agility of the infrastructure (e.g., the physical interconnect fabric 180), there is a growing trend to deploy either an overlay networking solution or a virtualized networking system on top of physical compute clusters where the overlay and/or virtualizing subsystem encapsulates and automatically manages the details of keeping the many physical network switches and routers (e.g., 185, 187) and channels (e.g., 186) up and running at desired bandwidths (BW) and desired qualities of service (QoS) represented here by 110. Fabric 180 may represent an example of fabric 14 of FIG. 1 and may include physical telecom channels, routers, gates, etc.

In such an environment, a server (e.g., 210x) may run one or more applications and/or guest operating systems. In order to enable many guest operating systems (also called virtual machines (VMs) 215) on a single server 210, there may be usage of a virtual machines monitoring system commonly known as hypervisor (such as ESX, Hyper-V, KVM, Xen, etc.). Examples of hypervisors are illustrated as hypervisor 31 of FIGS. 1 and 231 of FIG. 6B. A single application (e.g., user visible process UVP1 216) executing on a VM 215 may require many instances of compute and storage resources that may be provided by the infrastructure as multiple individual servers 210 or multiple virtual machines 215 running on one or more servers 210. In order for the application to share information amongst its distributed compute and storage instances and with the outside world, a telecommunications network 180 enables movement of this information as; for example, packet conveyed data signals 217. Every time a new application is instantiated and/or changed on the infrastructure, a respective virtual network (e.g., VNet 207v) may be created and/or changed to support the new/changed application and to allow all its compute and storage instances to share information with one another and/or the outside world. Each virtual network user 205, or VUser 205, may experience his/her/its own Virtual Network (VNet) 207 with its respective resources and issues, etc.

In a virtualized or overlay network environment, the edge of the network is extended from the physical network element (e.g., switch or a router 185) to a software switch (e.g., VRouter 232 shown in FIG. 6B) running inside the hypervisor (231) or inside the host operating system on the physical server (e.g., 210z) to provide a telecom virtualizing interface (VTI) 220. VRouter 232 may represent an example instance of software switches 30 of FIG. 2. The virtualized and/or overlayed network that is used by the application to communicate with its instances is created dynamically and managed by software switch controlling means (e.g., control plane VMs 112 of FIG. 5 or control plane 240 of FIG. 6B) having its own addressing and security scheme where the latter is orthogonal from the physical network 180 and its addressing scheme. There are many different methods that can be employed to transport packets (e.g., 217) within and across the virtual network(s) and over the physical network.

Network IP (and/or Ethernet) packets (e.g., 217) generated or consumed by the instances of the application in the virtual network domain may be encapsulated in another IP (and/or Ethernet) packet that is transported by the physical network. Herein, the virtual network packet will be referred to as inner packet and the physical network packet will be referred to as outer packet. The function of encapsulation and/or de-capsulation of the virtual network packet within physical network packet is done in the hypervisor 231 or the host O/S (not shown) running on the server 210. In addition, the encapsulation and de-capsulation function can also be performed at the edge of the network in a first-hop physical network switch router (e.g., 185).

Cloud data-center networks can constitute an example of a massively distributed complex system because the number of interconnected servers can be very large with each server presenting one or more links, each having a respective 1 Gbps or 10 Gbps or greater bandwidth link. In order to construct a network that can interconnect all such links, operators generally use a number of switches (or routers) with N input (ingress) links×M output (egress) links. Each of these individual switches can act as an IP router with its own IP address(es).

Figure 6B:
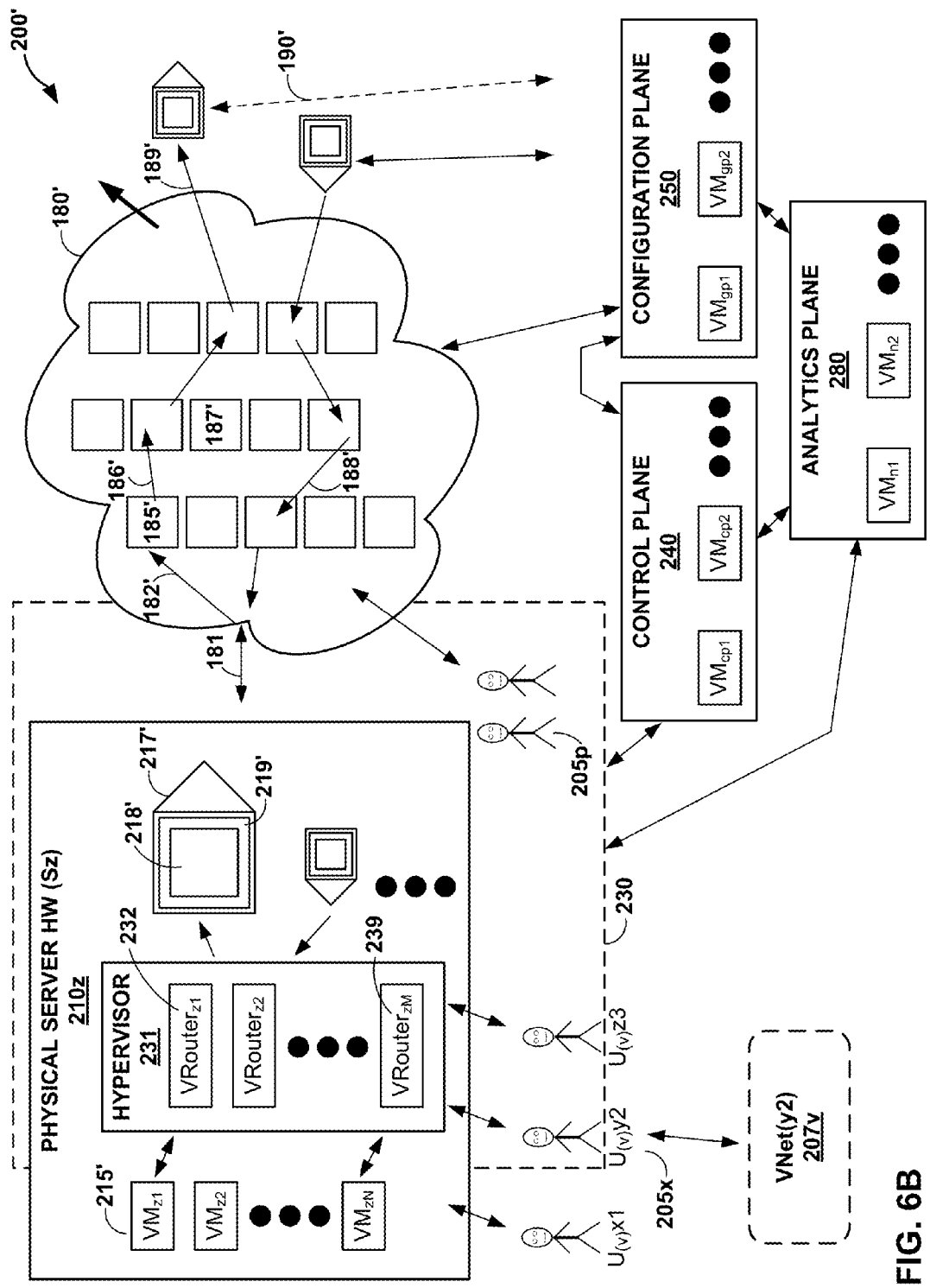
FIG. 6B is a block diagram showing further details of a virtualizing subsystem in which identifying likely faulty components may be carried out according to techniques described in this disclosure.

Referring to some of the specifics shown in FIGS. 6A-6B, there can be a plurality of different kinds of components in respective "tiers" or service planes of a virtualized overlay system. One of these planes is the virtual-to-physical forwarding plane 230. It includes the virtual network routers (VNRouters, or more simply VRouters 232-239). These components can reside in the respective hypervisors 231 of the respective physical servers (e.g., 210) or they can reside in a Top-of-Rack switch (not shown) which is typically included in the virtual-to-physical forwarding plane 230. When the VRouter is disposed in a hypervisor 231, it acts as a software switch having both respective virtual ports connected to the virtual machines (VMs) and physical ports corresponding to the physical I/O ports of the respective server 210. Each VNRouter selectively routes/switches packets between its virtual ports and the physical ports and/or between its virtual ports. The VNRouters may be considered as Data/Forwarding Plane components of the Virtual Network System.

Another of the plural tiers or planes within system 200 is referred to as the Control Plane 240 and it may contain a plurality of virtual machines (VMcp-i) implementing respective Controllers or Controller Processes. Controllers may represent instances of control plane VMs 112 of FIG. 5 that provide control functions within the Virtual Network System. The Controllers each operatively couples to a respective set of VNRouters and each distributes respective routing information signals to its VNRouters. In one embodiment, the relative scale of the Virtual Network System is on the order of 100s of 1000s of VNRouters (e.g., 232) and 100s of corresponding Controllers (e.g., VNcp1).

Another of the plural tiers or planes within system 200 is referred to as the Configuration Plane 250 and it may contain a plurality of virtual machines (VMgp-k) implementing respective Configuration Processes. Controllers may represent instances of configuration VMs 108 of FIG. 5 that provide control functions with respect to interconnect and/or other configurations within the Virtual Network System. The Configuration controllers each operatively couples to a respective parts of the physical network (180) and/or to respective parts of the Control Plane 250 and each distributes respective configuration information signals to its controlled counterparts.

Yet another of the plural tiers or planes within the system 200 is referred to as the Analytics plane 280. Components (e.g., VMn1) within the Analytics plane 280 are typically charged with automatically monitoring and/or automatically collecting reported states of other parts of the Virtual Network System. Components within the Analytics plane 280 may represent instances of analytics VMs 104 of FIG. 5. The Analytics components are tasked with gathering information from all other components in the system so as to develop a high-level view of what is occurring in the system as a whole. This "Big Data" information may be stored in a persistent database, e.g., analytics VM 106 of FIG. 5. This information can then be used to show the current state of the system, to help debug problems, to do historical or real-time analysis of the system and so on.

Because of the highly scalable and variable nature of system 200, it may be prone to many fault and failure modes. However, an administrator(s) of system 200 seeks to provide its users (e.g., 205x, 205y, 205w, 205z) with continuously robust, reliable, high bandwidth, and high quality services. In other words, the system 200 should be resilient and continue to operate at near peak capability despite isolated failures in various ones of its components. The various components that desirably remain failure free and/or are configured to work around known or expected failure modes include the different kinds of components in the respective and different tiers or planes, including the forwarding plane 230, the control plane 240, the configuration plane 250 and even the global analytics plane 280.

To realize these goals, it would be useful to have an ability to predict likely failures of particular components before the failures actually happen and to responsively replace and/or restart the likely-to-fail components and/or reconfigure interconnects around the likely-to-fail components before the latter actually fail. For instance, this prediction ability may allow system operators to systematically bringing down corresponding parts of the system during off-peak hours and to replace and/or fix the likely-to-fail components before actual failure thus minimizing the impact of likely failures on the overall system.

In accordance with the present disclosure, a method is provided for identifying likely faulty components in a massively distributed complex system that includes one or more of the following steps:
 (a) subdividing the system into a plurality of tiers (e.g., 230, 240, 250, 280) each characterized by having alike components (e.g., VRouters) within that tier;
 (b) for each respective tier, identifying respective quantitative parameters (e.g., memory failures per unit time, processor failures per unit time, channel failures per unit time, packet resends and/or drops per unit time, etc.) of respective components of the respective tier whose quantitative values are likely to act as indicators of component fault and/or failure in that respective tier;
 (c) for each respective tier, automatically repeatedly capturing sample snapshots of the identified respective quantitative parameters of the tier component(s);
 (d) for each respective tier, automatically repeatedly detecting component failures (e.g., lost packets);
 (e) for each respective detected component failure, logically associating the detected component failure with one or more of the respective captured parameter snapshots that immediately preceded the respective component failure;
 (f) automatically repeatedly training a trainable automated classifier to develop a classifying structure that distinguishes between first component parameter sets that logically associate with one or more detected failures and second component parameter sets that do not logically associate with the one or more detected failures;
 (g) after said training, placing the trained classifier in a prediction mode wherein the trained classifier is automatically repeatedly fed with the more recent and automatically repeatedly captured sample snapshots and wherein the trained classifier uses its developed classifying structure (e.g., class separation surface described below) to classify the in-prediction-mode sample snapshots as correlating to failure or as correlating to non-failure;
 (h) investigating those of the in-prediction-mode sample snapshots that were correlated to failure as being likely to be fault-indicating parameter sets; and
 (i) taking preemptive corrective and/or work-around measures for those of the respective tier components that were determined to be more highly likely to enter a failure mode based on the in-prediction-mode indication that the corresponding sample snapshots correlate to failure.

Also in accordance with techniques of this disclosure, a massively distributed complex system is provided as having a plurality of tiers and having a fault and/or failure predicting mechanism, the predicting mechanism comprising one or more of:
 (a) a subdividing mechanism that subdivides the system into a plurality of tiers each characterized by having alike components;
 (b) a parameters identifying mechanism that, for each respective tier, identifies respective quantitative parameters of respective components of the respective tier whose quantitative values are likely to act as indicators of likely component fault and/or failure;
 (c) a sampling mechanism that, for each respective tier, automatically repeatedly captures sample snapshots of the identified respective quantitative parameters of the tier component(s);

(d) a failure detecting mechanism that, for each respective tier, automatically repeatedly detects component failures;

(e) a failure to parameters associating mechanism that, for each respective detected component failure, logically associates (e.g., flags) the detected component failure with one or more of the respective captured parameter snapshots that immediately preceded the respective component failure;

(f) a training mechanism that automatically repeatedly trains a trainable automated classifier to develop a classifying structure that distinguishes between first component parameter sets that logically associate with a detected failure and second component parameter sets that do not logically associate with a detected failure;

(g) a predictions generating mechanism that, after said training, places the trained classifier in a prediction mode wherein the trained classifier is automatically repeatedly fed with the automatically repeatedly captured sample snapshots and wherein the trained classifier uses its developed classifying structure to classify the in-prediction-mode sample snapshots as correlating to likely failure or as correlating to likely non-failure;

(h) a likely fault and/or failure investigating mechanism that follows up on those of the in-prediction-mode sample snapshots that were correlated to failure as being likely to be fault-indicating parameter sets; and (i) an action taking mechanism that preemptively takes corrective and/or work-around measures for those of the respective tier components that were determined to be more highly likely to enter a failure mode based on the in-prediction-mode indication that the corresponding sample snapshots correlate to failure.

There are various kinds of trainable automated classifiers that can be trained to classify input data sets as belonging to one of a plurality of distinct (e.g., mutually exclusive) classes. One example is neural nets. Another example is that of so-called, Support Vector Machines (SVMs). These automated machines include supervised learning models with associated learning algorithms that analyze supplied sample data and recognize patterns of distinction in the supplied data samples (e.g., reference sets) and use the analysis for developing classification and regression analysis models. A basic SVM takes in a first set of reference input data together with predetermined classification for the first set of reference input data and produces one or more classifying models for the supplied reference input data. Then after such a learning mode, the SVM takes in a second set of non-referenced input data (data that generally does not come with predetermined classification therefor) and it predicts, for each given one of the second input data sets, which of two or more possible classes the input data belongs to. In the case of the present disclosure of invention, it is assumed that there are two mutually exclusive classes, one being that of highly likely to fail (e.g., due to a growing fault) and the second being that of not highly likely to fail. Such an SVM can be viewed as being a non-probabilistic binary linear classifier. Given a set of training examples, each marked as belonging to one of two categories, an SVM training algorithm builds a model that subsequently (after training) assigns new examples into one category (e.g., likely to fail) or the other (e.g., not likely to fail).

Figure 7:
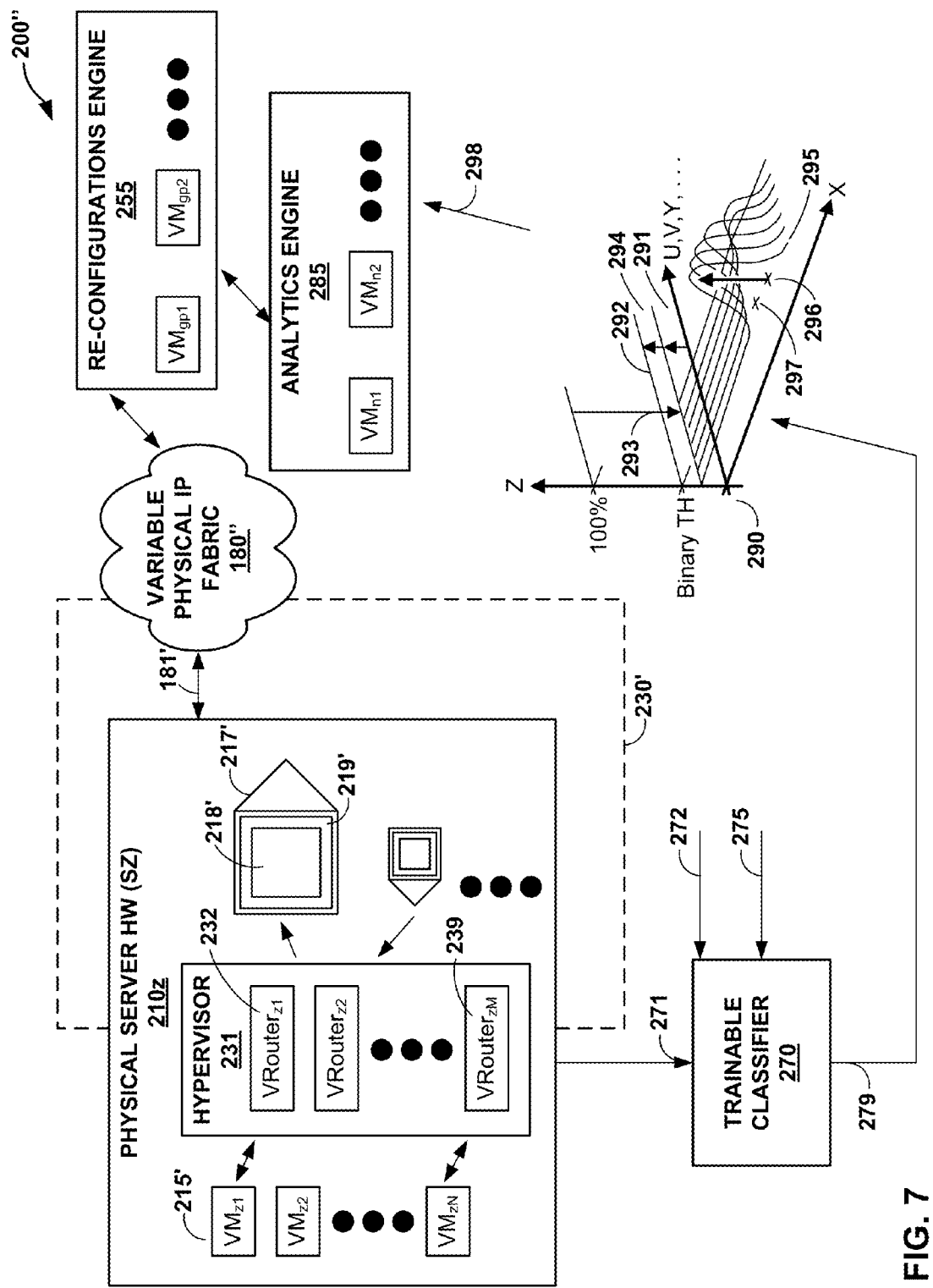
FIG. 7 is a schematic and signal flow diagram illustrating how a trainable classifier is used to heuristically develop a classification algorithm for predicting the likelihood of component fault and/or failure according to techniques described herein.

FIG. 7 is a block diagram of an system 200" that includes, for a respective one of its tiers (e.g., the VRouters tier), a corresponding trainable classifier (e.g., SVM) 270 that is coupled to automatically repeatedly (e.g., periodically) receive parameter sets or "snapshots," e.g., VR parameter snapshots 271, indicative of corresponding operating modes of the components (e.g., the VRouters 232-239) that are being watched for possible entry into a significant fault or highly likely failure mode. More specifically, during a training mode (signaled on line 275 signaling either training mode or prediction mode for trainable classifier 270), each parameters snapshot 271 is accompanied by a training-mode classification signal 272 indicating whether the sample belongs to the failure class or the non-failure class. In response to repeated training sessions, the trainable classifier 270 develops an internal algorithm (represented by classification separation surface 295) that classifies subsequently received parameter snapshots 271(T2) as belonging to either the likely good class (293 as measured down from the 100% likely bad plane to surface 295) or the likely bad class (291 as measured up from the 0% likely bad plane to surface 295), where the TH plane can be disposed above troughs of surface 295 by Tolerance amount TOL 294). This output 298 (e.g., a binary signal indicating surface 295 is above or below the TH plane 292) is coupled to a corresponding analytics engine 285 that determines what to do in response to the classification determination. On framework 290, spot 297 denotes a recent input spot and spot 296 denotes a trained bad spot. The corresponding analytics engine 285 may be coupled to a re-configuration engine 255 that, in the case where a subsequently received parameter snapshots 271(T2) indicates likelihood of failure, re-configures the system so as to try to avoid the failure.

In some examples, the Analytics plane includes analytics engine 285 to collect respective snapshot data relevant to likelihood of failure from various components within the respective tiers and/or planes of the system. Respective snapshot data may include for example, parameters like CPU utilization levels, memory utilization levels, alarm levels in the various system parts, number of peers of a protocol session, number of protocol sessions for a component, and so on. These collected respective and likely to be relevant snapshots 271 could be early indicators of growing faults and/or upcoming failures. The Analytics plane will also collect the failure data of various components where the latter are training reference points. For instance, a connection failure to a component and a subsequent reconnection with a restart data would indicate to the Analytics plane that the respective component has gone down (failed) and needed to be restarted or replaced.

Analytics plane may collect respective snapshot data from various components using SDN techniques. Examples of SDN techniques are described in SOFTWARE-DEFINED MOBILE CORE, U.S. patent application Ser. No. 13/724,975, filed Dec. 21, 2012, the contents of which being incorporated by reference herein. As described above with VNCs 22, 100, a distributed network controller may operate as a control plane for at least some control plane functionality of components, such as servers and chassis/TOR switches, and receive snapshot data by a SDN communication protocol that also transports control plane configuration information. Examples of the SDN communication protocol include XMPP, described for instance with respect to FIG. 5, and OpenFlow.

While FIG. 7 shows, by way of example, the collecting of snapshots from the VRouters tier 232-239 of a respective one server 210z, it is to be understood that similar collections of respectively relevant parameter snapshots and development of classification surfaces 295 for each will be taking place for other tiers and/or system planes and/or servers. It is to be appreciated that the developed classification surfaces 295 of each monitored component tier may not be accessible in certain kinds of classifiers such as neural nets. As the above input data samples 271, 272 are input as training and/or prediction parameters to the respective SVM algorithms, the latter learn and/or indicate whether the respective component falls in one of two categories—likely good 293 or likely failing 291. The shape of the classification surface 295 may be a function of a predetermined binary threshold level TH 292 and/or a partitioning (not shown) of the XY plane. The XYZ framework 290 shown in FIG. 7 is for the sake of simple illustration and other frameworks according to this disclosure may have N-dimensional mappings with each axis (e.g., U, V, X, Y, etc.) representing a respective one of the monitored parameters. Part of learning is that of determining for each tier those parameters that are best indicators of growing faults and/or predictable failures. The trained classification algorithm (e.g., one that uses classification surface 295) is afterwards used to predict the likelihood of failure of the respective components on a continuous basis as the data is being collected by the Analytics plane. The learning algorithms can also be enhanced on a continuous basis by adding/changing input parameters, thresholds, parameter space partitionings, etc.

Figure 8A:
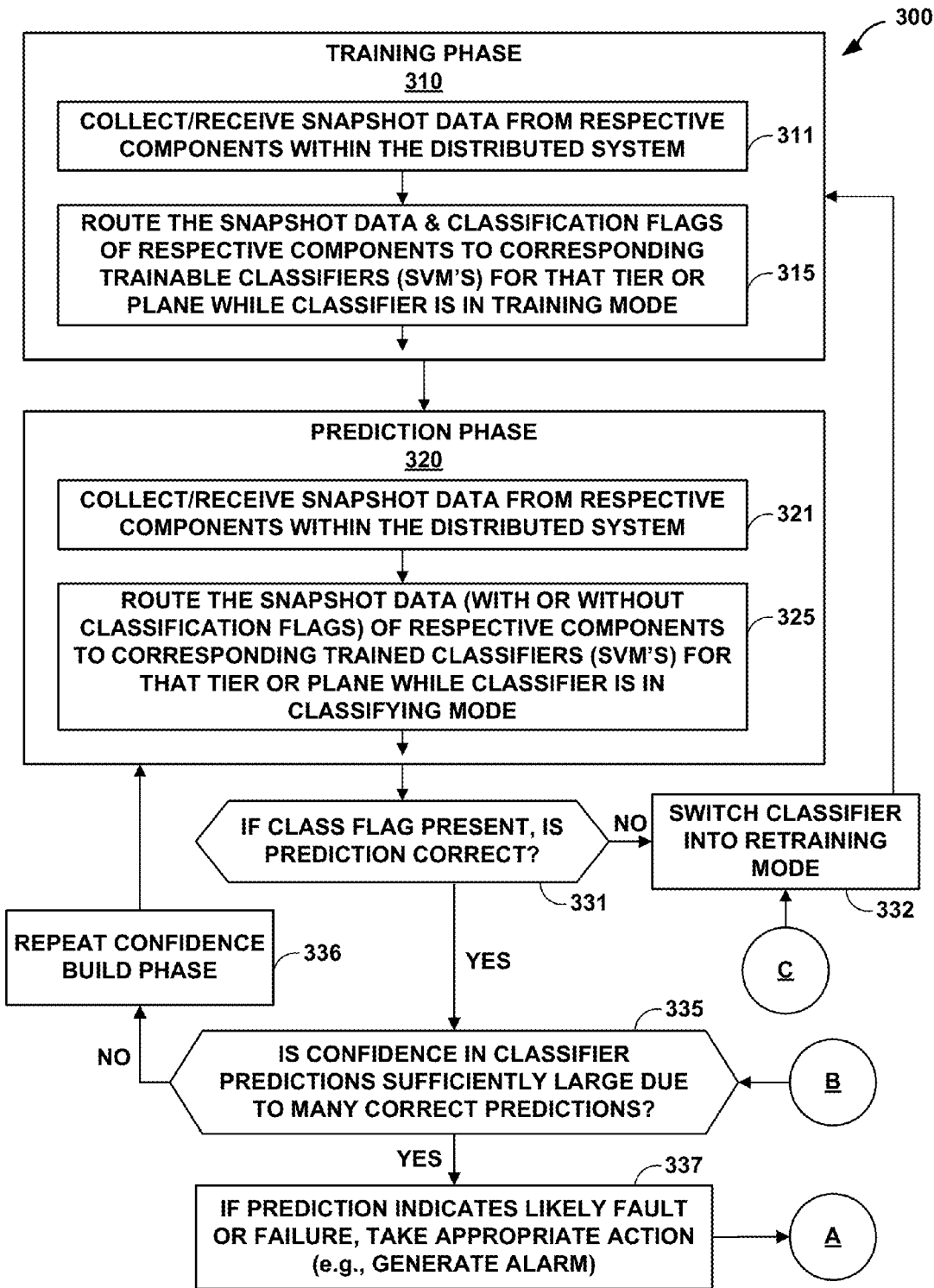
FIGS. 8A-8B depict a flow chart for an example mode of operation of a system according to techniques described herein.
Figure 8B:
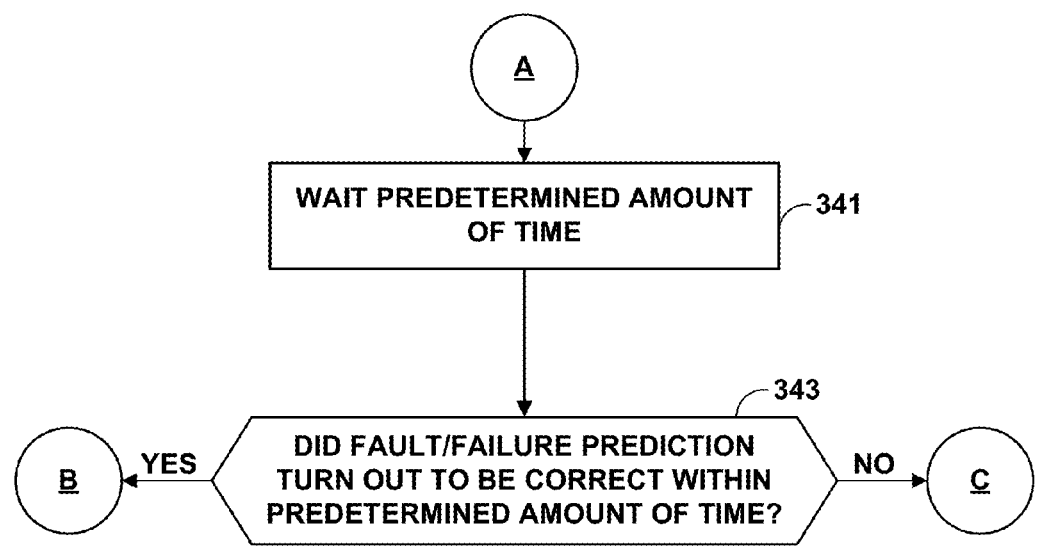

FIGS. 8A-8B provide a flowchart of a process 300 that may be carried out in the system of FIG. 7. Portion 310 corresponds to the training mode/phase. Analytics engine 285 receives parameter snapshots data 271 for components of system 200 (311). Analytics engine 285 provides parameter snapshots data 271 and classification flags of respective components, e.g., training-mode classification signal 272, to trainable classifier 270 while trainable classifier 270 is in training mode (315).

Portion 320 corresponds to the prediction mode. Analytics engine 285 receives parameter snapshots data 271 for components of system 200 (321). Analytics engine 285 provides parameter snapshots data 271 and classification flags of respective components, e.g., training-mode classification signal 272, to trainable classifier 270 while trainable classifier 270 is in classifying mode (325).

Portion 330 corresponds to a confidence building and action mode. Upon a prediction, if a class flag is present and the prediction is not correct (NO branch of 331), analytics engine 285 may switch trainable classifier 270 to retraining mode (332). If (YES branch of 331), if the confidence in trainable classifier 270 prediction is not sufficiently large due to many correct predictions (NO branch of 335), the analytics engine 285 and trainable classifier 270 repeat the confidence build phase (336). Otherwise (YES branch of 335), if the prediction indicates likely fault or failure, then analytics engine 285 takes appropriate action, which may include generating an alarm, sending a message to an administrator, etc. (337). Analytics engine 285 then waits a predetermined amount of time (341) to determine whether the fault/failure prediction was correct within the time (343). If not (NO branch of 343), analytics engine 285 may switch trainable classifier 270 to retraining mode (332). If the prediction was correct (YES branch of 343), the process moves to step 335.

Figure 9:
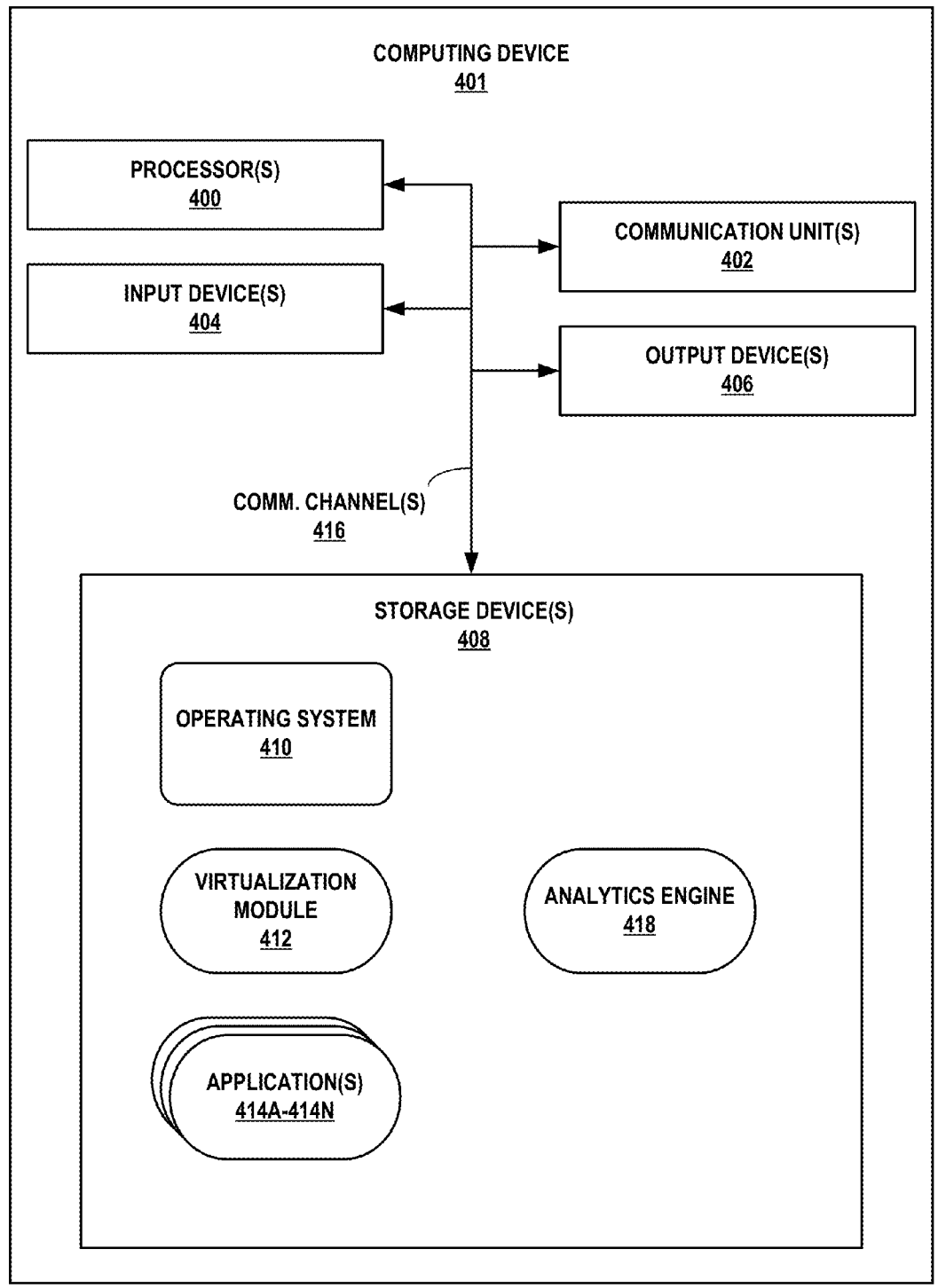
FIG. 9 is a block diagram illustrating an example computing device for performing operations in accordance with one or more aspects of the present disclosure.

FIG. 9 is a block diagram illustrating an example device that participates in identifying likely faulty components according to techniques described in this disclosure. FIG. 9 illustrates only one particular example of computing device 401, and many other examples of computing device 401 may be used in other instances.

As shown in the specific example of FIG. 9, computing device 401 includes one or more processors 400, one or more communication units 402, one or more input devices 404, one or more output devices 406, and one or more storage devices 408. Computing device 401, in the specific example of FIG. 9, further includes operating system 410, virtualization module 412, and one or more applications 414A-414N (collectively "applications 414"). Each of components 400, 402, 404, 406, and 408 may be interconnected (physically, communicatively, and/or operatively) for inter-component communications. As one example in FIG. 9, components 400, 402, 404, 406, and 408 may be coupled by one or more communication channels 416. In some examples, communication channels 416 may include a system bus, network connection, interprocess communication data structure, or any other channel for communicating data. Virtualization module 412 and applications 414, as well as operating system 410 may also communicate information with one another as well as with other components in computing device 401.

Processors 400, in one example, are configured to implement functionality and/or process instructions for execution within computing device 401. For example, processors 400 may be capable of processing instructions stored in storage devices 408. Examples of processors 400 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 401 during operation. Storage devices 408, in some examples, are described as a computer-readable storage medium. In some examples, storage devices 408 are a temporary memory, meaning that a primary purpose of storage devices 408 is not long-term storage. Storage devices 408, in some examples, are described as a volatile memory, meaning that storage devices 408 do not maintain stored contents when the computer is turned off. Examples of volatile memories include random access memories (RAM), dynamic random access memories (DRAM), static random access memories (SRAM), and other forms of volatile memories known in the art. In some examples, storage devices 408 are used to store program instructions for execution by processors 400. Storage devices 408, in one example, are used by software or applications running on computing device 401 (e.g., operating system 410, virtualization module 412 and the like) to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 408 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 401, in some examples, also includes one or more communication units 402. Computing device 401, in one example, utilizes communication units 402 to communicate with external devices. Communication units 402 may communicate, in some examples, by sending data packets over one or more networks, such as one or more wireless networks, via inbound and outbound links. Communication units 402 may include one or more network interface cards (IFCs), such as an Ethernet card, an optical transceiver, a radio frequency transceiver, or any other type of device that can send and receive information.

Computing device 401, in one example, also includes one or more input devices 404. Input devices 404, in some examples, are configured to receive input from a user through tactile, audio, or video feedback. Examples of input devices 404 include a presence-sensitive display, a mouse, a keyboard, a voice responsive system, video camera, microphone or any other type of device for detecting a command from a user. In some examples, a presence-sensitive display includes a touch-sensitive screen.

One or more output devices 406 may also be included in computing device 401. Output devices 406, in some examples, are configured to provide output to a user using tactile, audio, or video stimuli. Output devices 406, in one example, include a presence-sensitive display, a sound card, a video graphics adapter card, or any other type of device for converting a signal into an appropriate form understandable to humans or machines. Additional examples of output devices 406 include a speaker, a cathode ray tube (CRT) monitor, a liquid crystal display (LCD), or any other type of device that can generate intelligible output to a user.

Computing device 401 may include operating system 412. Operating system 412, in some examples, controls the operation of components of computing device 401. For example, operating system 412, in one example, facilitates the communication of modules applications 414 with processors 400, communication units 402, input devices 404, output devices 406, and storage devices 410. Applications 414 may each include program instructions and/or data that are executable by computing device 401. As one example, application 414A may include instructions that cause computing device 401 to perform one or more of the operations and actions described in the present disclosure.

In accordance with techniques of the present disclosure, computing device 401 may include an analytics engine 418 application to identify likely faulty components. Analytics engine 418 may represent an example instance of analytics engine 285. Analytics engine 418 may include a trainable classifier that receives parameter snapshots indicative of corresponding operating modes of the components that are being watched for possible entry into a significant fault or highly likely failure mode. More specifically, during a training mode, each parameters snapshot is accompanied by a training-mode classification signal indicating whether the sample belongs to the failure class or the non-failure class. In response to repeated training sessions, the trainable classifier develops an internal algorithm that classifies subsequently received parameter snapshots as belonging to either the likely good class or the likely bad class, where the TH plane can be disposed above troughs of surface by a tolerance amount. Analytics engine 418 determines an appropriate response to the classification determination. Computing device 401 may be coupled to a re-configuration engine that, in the case where a subsequently received parameter snapshots indicates likelihood of failure, re-configures the system so as to try to avoid the failure in response to direction or component fault indications from analytics engine 418.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method of predicting component failure, the method comprising:
    receiving, by a communication protocol and with a virtual network controller that includes an analytics plane to analyze operations of a plurality of components in one or more virtual networks, a first parameter set from each of the components, wherein a parameter set from a component includes one or more quantitative parameters that each describes a state of the component;
    receiving, by the communication protocol and with the virtual network controller, an indication of detected component failure for one or more of the components;
    training, with the virtual network controller and using the first parameter sets and the indication of detected component failure, a trainable automated classifier to develop a classifying structure that distinguishes between component parameter sets that logically associate with a detected component failure and component parameter sets that do not logically associate with a detected component failure;
    receiving, by the communication protocol and with the virtual network controller, a second parameter set from each of the components; and
    predicting, with the virtual network controller using the trainable automated classifier and the classifying structure, a failure of a first one of the components.

2. The method of claim 1, wherein predicting a failure of a first one of the components comprises classifying the second parameter set for the first one of the components to a likely bad class according to the classifying structure.

3. The method of claim 1,
    wherein the classifying structure comprises one or more classification separation surfaces, and wherein predicting a failure of a first one of the components comprises classifying the second parameter set for the first one of the components to a likely bad class according to one of the classification separation surfaces.

4. The method of claim 3,
wherein the one of the classification separation surfaces is associated with a tolerance amount, and
wherein classifying the second parameter set for the first one of the components to a likely bad class comprises determining the second parameter set exceeds the tolerance amount.

5. The method of claim 1,
wherein the trainable automated classifier comprises one or more support vector machines, and
wherein training the trainable automated classifier comprises inputting the first parameter sets and the indication of detected component failure to the support vector machines to produce the classifying structure.

6. The method of claim 1,
wherein the virtual network controller is a distributed virtual network controller comprising a plurality of virtual network controller nodes, and
wherein each of the virtual network controller nodes comprises an analytics virtual machine that exchanges at least some analytics information to implement the analytics plane.

7. The method of claim 1, wherein the plurality of components includes virtual network elements that include one or more of servers, top-of-rack (TOR) switches, or chassis switches.

8. The method of claim 1, wherein the virtual network controller uses a software-defined network protocol to receive the first parameter set from each of the components.

9. The method of claim 1, wherein the components execute one of a forwarding plane, control plane, or configuration plane for the virtual networks.

10. A method for identifying likely faulty components in a massively distributed system, the method comprising:
    (a) subdividing the system into a plurality of tiers;
    (b) for each respective tier, identifying respective quantitative parameters of respective components of the respective tier whose quantitative values are likely to act as indicators of component failure;
    (c) for each respective tier, automatically repeatedly capturing sample snapshots of the identified respective quantitative parameters of the tier components;
    (d) for each respective tier, automatically repeatedly detecting component failures;
    (e) for each respective detected component failure, logically associating the detected component failure with one or more of the respective captured parameter snapshots that immediately preceded the respective component failure;
    (f) automatically repeatedly training a trainable automated classifier to develop a classifying structure that distinguishes between first component parameter sets that logically associate with a detected failure and second component parameter sets that do not logically associate with a detected failure;
    (g) after said training, placing the trained classifier in a prediction mode wherein the trained classifier is automatically repeatedly fed with the automatically repeatedly captured sample snapshots and wherein the trained classifier uses its developed classifying structure to classify the in-prediction-mode sample snapshots as correlating to likely failure or as correlating to likely non-failure;
    (h) investigating those of the in-prediction-mode sample snapshots that were correlated to failure as being likely to be fault-indicating parameter sets; and
    (i) taking preemptive measures for those of the respective tier components that were determined to be more highly likely to enter a failure mode based on the in-prediction-mode indication that the corresponding sample snapshots correlate to failure.

11. A virtual network controller comprising:
an analytics plane;
a control plane;
one or more processors configured to execute the analytics plane to analyze operations of a plurality of components in one or more virtual networks,
wherein the control plane receives, by a communication protocol, a first parameter set from each of the components, wherein a parameter set from a component includes one or more quantitative parameters that each describe a state of the component,
wherein the control plane receives, by the communication protocol, an indication of detected component failure for one or more of the components, and
wherein the control plane provides the first parameter sets and the indication of detected component failure to the analytics plane;
a trainable automated classifier,
wherein the analytics plane trains, using the first parameter sets and the indication of detected component failure, the trainable automated classifier to develop a classifying structure that distinguishes between first component parameter sets that logically associate with a detected component failure and second component parameter sets that do not logically associate with a detected component failure,
wherein the control plane receives, by the communication protocol, a second parameter set from each of the components and provides the second parameter sets to the analytics plane, and
wherein the analytics plane predicts, using the trainable automated classifier and the classifying structure, a failure of a first one of the components.

12. The virtual network controller of claim 11, wherein predicting a failure of a first one of the components comprises classifying the second parameter set for the first one of the components to a likely bad class according to the classifying structure.

13. The virtual network controller of claim 11,
wherein the classifying structure comprises one or more classification separation surfaces, and
wherein the analytics plane predicts the failure of a first one of the components by classifying the second parameter set for the first one of the components to a likely bad class according to one of the classification separation surfaces.

14. The virtual network controller of claim 13,
wherein the one of the classification separation surfaces is associated with a tolerance amount, and
wherein classifying the second parameter set for the first component to a likely bad class comprises determining the second parameter set exceeds the tolerance amount.

15. The virtual network controller of claim 11,
wherein the trainable automated classifier comprises one or more support vector machines, and
wherein the analytics plane trains the trainable automated classifier by inputting the first parameter sets and the indication of detected component failure to the support vector machines to produce to the classifying structure.

16. The virtual network controller of claim 11, further comprising:
- a plurality of virtual network controller nodes that implement a distributed virtual network controller,
- wherein each of the virtual network controller nodes comprises an analytics virtual machine that exchange at least some analytics information to implement the analytics plane.

17. The virtual network controller of claim 11, wherein the plurality of components include virtual network elements that include one or more of servers, top-of-rack (TOR) switches, or chassis switches.

18. The virtual network controller of claim 11, wherein the virtual network controller uses a software-defined network protocol to receive the first parameter set from each of the components.

19. The virtual network controller of claim 11, wherein the components execute one of a forwarding plane, control plane, or configuration plane for the virtual networks.

20. A non-transitory computer-readable medium comprising instructions that, when executed, cause one or more programmable processors to:
- receive, by a communication protocol and with a virtual network controller that includes an analytics plane to analyze operations of a plurality of components in one or more virtual networks, a first parameter set from each of the components, wherein a parameter set from a component includes one or more quantitative parameters that each describes a state of the component;
- receive, by the communication protocol and with the virtual network controller, an indication of detected component failure for one or more of the components;
- train, with the virtual network controller and using the first parameter sets and the indication of detected component failure, a trainable automated classifier to develop a classifying structure that distinguishes between component parameter sets that logically associate with a detected component failure and component parameter sets that do not logically associate with a detected component failure;
- receive, by the communication protocol and with the virtual network controller, a second parameter set from each of the components; and
- predict, with the virtual network controller using the trainable automated classifier and the classifying structure, a failure of a first one of the components.

* * * * *